(12) United States Patent
Xu et al.

(10) Patent No.: US 11,604,016 B2
(45) Date of Patent: *Mar. 14, 2023

(54) METHOD OF ADJUSTING ELECTRONIC EXPANSION VALVE OF OUTDOOR UNIT OF AIR-CONDITIONER

(71) Applicant: QINGDAO HAIER AIR CONDITIONER GENERAL CORP., LTD., Qingdao (CN)

(72) Inventors: Wenming Xu, Qingdao (CN); Yu Fu, Qingdao (CN); Mingjie Zhang, Qingdao (CN); Fei Wang, Qingdao (CN); Beibei Xu, Qingdao (CN); Juke Liu, Qingdao (CN); Rongbang Luo, Qingdao (CN); Junjun Yuan, Qingdao (CN); Shuang Ding, Qingdao (CN)

(73) Assignee: QINGDAO HAIER AIR CONDITIONER GENERAL CORP., LTD., Qingdao (CN)

( * ) Notice: Subject to any disclaimer, the term of this patent is extended or adjusted under 35 U.S.C. 154(b) by 64 days.

This patent is subject to a terminal disclaimer.

(21) Appl. No.: 16/314,848

(22) PCT Filed: Feb. 9, 2017

(86) PCT No.: PCT/CN2017/073138
§ 371 (c)(1),
(2) Date: Jan. 2, 2019

(87) PCT Pub. No.: WO2018/006596
PCT Pub. Date: Jan. 11, 2018

(65) Prior Publication Data
US 2019/0310001 A1 Oct. 10, 2019

(30) Foreign Application Priority Data
Jul. 4, 2016 (CN) .......................... 201610515150.5

(51) Int. Cl.
*F25B 39/02* (2006.01)
*F25B 19/00* (2006.01)
(Continued)

(52) U.S. Cl.
CPC .......... *F25B 39/028* (2013.01); *F25B 19/005* (2013.01); *F25B 41/062* (2013.01);
(Continued)

(58) Field of Classification Search
CPC .. F25B 41/062; F25B 49/02; F25B 2700/171; F25B 2600/2513; F25B 2700/2106;
(Continued)

(56) References Cited

U.S. PATENT DOCUMENTS 5,568,732 A * 10/1996 Isshiki ..................... F24F 11/30
62/129

FOREIGN PATENT DOCUMENTS

| CN | 101539151 | 9/2009 |
| CN | 105299974 | 2/2016 |

(Continued)

Primary Examiner — Steve S Tanenbaum
(74) Attorney, Agent, or Firm — Jiwen Chen; Jacobson Holman PLLC

(57) ABSTRACT

Provided is a control method on electronic expansion valve in air conditioner comprises: obtaining a real-time running frequency of compressor, a real-time exhaust temperature and a real-time outdoor environment temperature as the compressor running; comparing the real-time running frequency of compressor with a first set frequency; if the real-time running frequency is greater than or equal to the first set frequency, obtaining an integral coefficient of the PID algorithm according to a first set rule; if the real-time running frequency is less than the first set frequency, obtaining an integral coefficient of the PID algorithm according to the comparison of the real-time outdoor environment temperature and the first set outdoor environment temperature (Continued)

and a second set rule, or according to the comparison of the real-time outdoor environment temperature and the first set outdoor environment temperature and a third set rule, wherein the selection is based on whether the air conditioner is working in cooling mode or in heating mode; performing a PID control on the electronic expansion valve by an error of the difference between real-time exhaust temperature and a set target exhaust temperature. The method realizes an accurate and stable control on electronic expansion valve opening amount.

8 Claims, 1 Drawing Sheet

(51) Int. Cl.
  *F25B 41/06*  (2006.01)
  *F25B 49/02*  (2006.01)
  *F24F 11/62*  (2018.01)
  *F24F 11/30*  (2018.01)

(52) U.S. Cl.
  CPC .......... *F25B 49/02* (2013.01); *F25B 2500/19* (2013.01); *F25B 2600/2513* (2013.01); *F25B 2700/171* (2013.01); *F25B 2700/2106* (2013.01); *F25B 2700/21152* (2013.01)

(58) Field of Classification Search
  CPC ........ F25B 2500/19; F25B 2700/21152; F24F 11/62; F24F 2110/00; F24F 11/30; F24F 2110/10; F24F 2110/12
  USPC .......................................................... 62/504
  See application file for complete search history.

(56) References Cited

FOREIGN PATENT DOCUMENTS

| | | |
|---|---|---|
| CN | 105423668 | 3/2016 |
| JP | 2011027287 | 2/2011 |

* cited by examiner

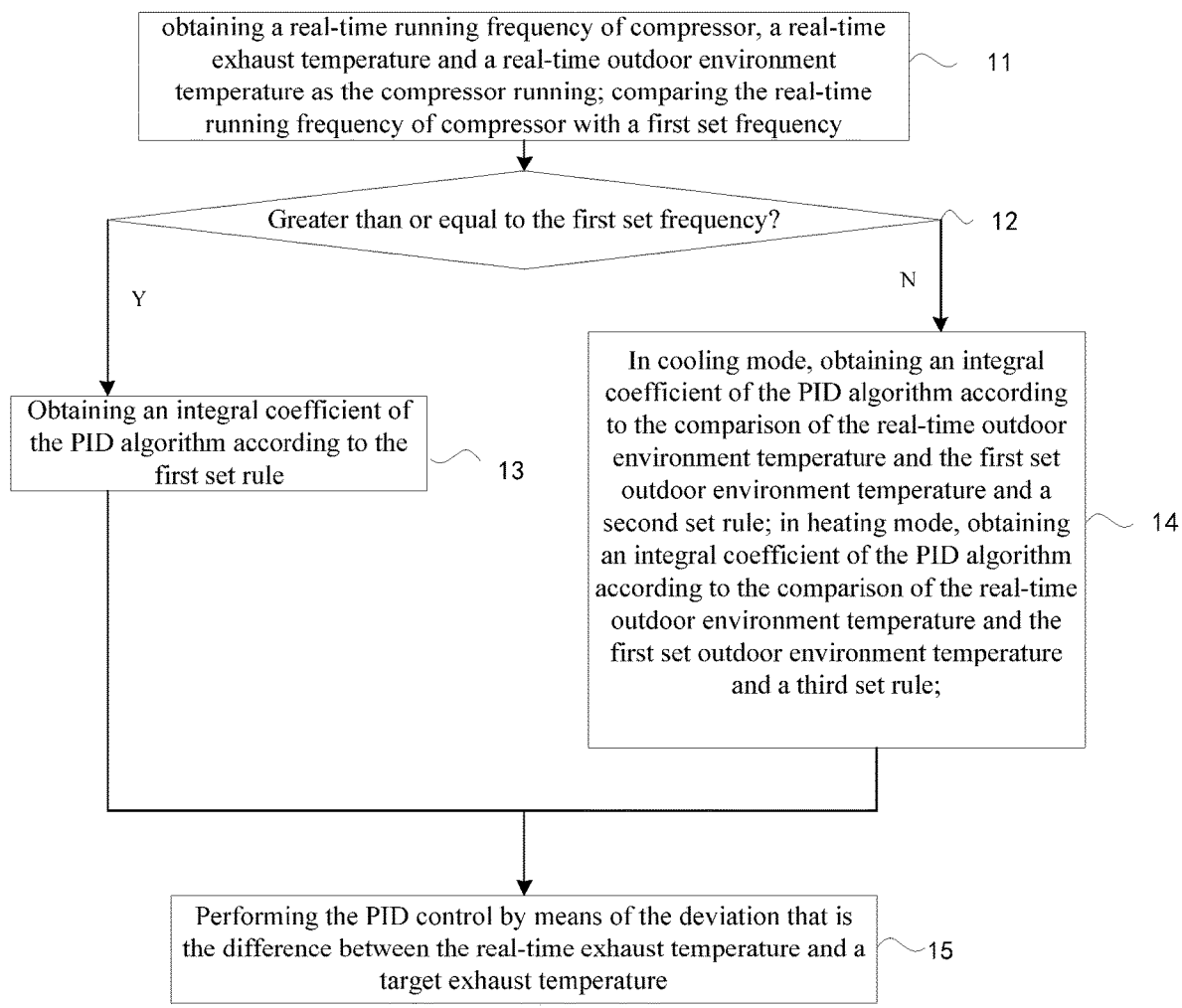

METHOD OF ADJUSTING ELECTRONIC EXPANSION VALVE OF OUTDOOR UNIT OF AIR-CONDITIONER

This is a U.S. national stage application of PCT Application No. PCT/CN2017/073138 under 35 U.S.C. 371, filed Feb. 9, 2017 in Chinese, claiming priority of Chinese Application No. 201610515150.5, filed Jul. 4, 2016, all of which are hereby incorporated by reference The present invention belongs to the technical field of Heating Ventilation Air Conditioning. In particular, the invention relates to the control of an air conditioner, more specifically, is a method of adjusting electronic expansion valve of outdoor unit of air conditioner.

BACKGROUND

Electronic expansion valve is a kind of new control element commonly used in refrigerant circulation system of air conditioner. Electronic expansion valve opening is controlled to regulate the amount of refrigerant circulating in air conditioning system in order to meet the performance demand. Hence, the control of electronic expansion valve is critical for evaluating the energy efficiency ratio of the air conditioning system.

PID is an eligibly control technique for the opening of electronic expansion valve. The control action continuously calculates an error value as the difference between an actual output temperature and a desired output temperature of the compressor in air conditioning system, and applies a correction based on the PID algorithm to adjust the opening amount of the electronic expansion valve to a desired degree at a great rate. PID tuning improves the adjustment process efficiency, and it can bring the set point closer to the actual outdoor condition. But the proportional, integral and derivative terms of the typical PID algorithm applied on EEV are fixed in the prior art, and the consequence is that the control could not properly satisfy varied air conditioner capacities or working conditions, which means the loop may not respond accurately. In this way, the energy efficiency ratio of the HVAC cooling device may be unable to reach the desired level.

SUMMARY OF THE INVENTION

An aspect of the present invention is to provide a method of adjusting electronic expansion valve in air conditioner. The improved PID control could enable the loop to respond accurately and stably, so that the energy efficiency of air conditioner refrigerant circulation could be improved as well.

In order to achieve the above object, the present invention is implemented by the following technical solutions:

A method of adjusting electronic expansion valve of outdoor unit of air conditioner comprises:

obtaining a real-time running frequency, a real-time exhaust temperature and a real-time outdoor environment temperature as compressor running; and comparing the real-time running frequency with a first set frequency;

if the real-time running frequency is greater than or equal to the first set frequency, obtaining an integral coefficient according to a first set rule; if the real-time running frequency is less than the first set frequency, performing a process comprising:

if the air conditioner is working in cooling mode, comparing the real-time outdoor environment temperature with a first set outdoor environment temperature; if the real-time outdoor environment temperature is less than the first set outdoor environment temperature, obtaining an integral coefficient of the PID algorithm according to a first set basic integral coefficient and a second set rule; if the real-time outdoor environment temperature is greater than or equal to the first set outdoor environment temperature, obtaining an integral coefficient of the PID algorithm according to a second set basic integral coefficient and the second set rule; wherein the integral coefficient of the PID algorithm obtained according to the first set rule is greater than or equal to the integral coefficient of the PID obtained according to the second set rule and the first set basic integral coefficient is greater than the second set basic integral coefficient;

if the air conditioner is working in heating mode, comparing the real-time outdoor environment temperature with a second set outdoor environment temperature; if the real-time outdoor environment temperature is greater than the second set outdoor environment temperature, obtaining an integral coefficient of the PID algorithm according to a third set basic integral coefficient and a third set rule; if the real-time outdoor environment temperature is less than or equal to the second set outdoor environment temperature, obtaining an integral coefficient of the PID algorithm according to a fourth set basic integral coefficient and the third set rule; wherein the integral coefficient of the PID algorithm obtained according to the first set rule is greater than or equal to the integral coefficient of the PID obtained according to the third set rule, and the third set basic integral coefficient is greater than the fourth set basic integral coefficient;

Then performing a PID control by means of the deviation that is a difference of the real-time exhaust temperature and a set target exhaust temperature on the opening amount of the electronic expansion valve; the integral coefficient of the PID algorithm of the PID control is obtained according to the first set rule, the second set rule or the third set rule.

Compared with the prior art, the advantages and positive effects of the present invention are: in the process as described above to control the electronic expansion valve opening amount, as the compressor works at a low-frequency state, a smaller integral coefficient is selected in the PID algorithm, which limited adjustment in a small range as the compressor working in the low-frequency state so as to reduce potential fluctuation of the exhaust temperature or oscillation of adjusted valve opening amount; as the compressor works at a non-low-frequency state, a larger integral coefficient is selected in the PID algorithm, which allows the adjustment within a flexible wide range so as to improve response speed. Those refinements improve the accuracy and reliability of the control on the electronic expansion valve opening amount, which is advantageous to optimizing the energy efficiency ratio of the air conditioning refrigerant circulation. Moreover, the integral coefficient varies with respect to different outdoor environment temperature as the compressor working at the low-frequency state, so that it could prevent potential fluctuation of the exhaust temperature or oscillation of the adjusted opening amount caused by the worsen outdoor environment. The consideration on both of compressor operating parameters and outdoor environment conditions makes the control method more widely available to varied air conditioner capacities or working conditions.

Other features and advantages of the present invention will become apparent referred to the Detailed Description.

BRIEF DESCRIPTION OF THE DRAWINGS

FIG. 1 is a flow chart of a method of adjusting electronic expansion valve of outdoor unit of air conditioner;

DETAILED DESCRIPTION OF THE INVENTION

For the purpose of promoting and understanding of the principles of the invention, reference will now be made to the embodiment illustrated in the drawings and specific language will be used to describe the same.

Shown in FIG. 1 is a flow chart of a method of adjusting electronic expansion valve of outdoor unit of air conditioner according to one embodiment of the present invention. To be specific, FIG. 1 is a flow chart showing one control implementation of opening amount of an electronic expansion valve in air conditioning refrigerant circulation.

The control method on electronic expansion valve in air conditioner shown in FIG. 1 comprises the following steps:

Step 11: obtaining a real-time running frequency, a real-time exhaust temperature and a real-time outdoor environment temperature as compressor running; and comparing the real-time running frequency with a first set frequency;

In Step 11, the real-time running frequency indicates a sampled real-time speed frequency obtained as the compressor running based on a preset sampling rate. It is easy to read out the real-time speed frequency by a controller installed in the air conditioner because the controller is also used for driving the compressor; the real-time exhaust temperature indicates a sampled real-time exhaust temperature of the compressor obtained based on a preset sampling rate as the compressor running, which could be collected by a temperature sensor at the output of the compressor and read out by the controller; the real-time outdoor environment temperature indicates a sampled temperature of the ambient surrounding the compressor obtained based on a preset sampling rate, which could be collected by a temperature sensor on the outdoor unit of the air conditioner and read out by the air conditioner controller.

After obtaining the real-time running frequency, comparing the real-time running frequency with the first set frequency; wherein the first set frequency is a frequency value preset and stored in the controller of air conditioner and could be modified by authorization; the first set frequency represents a boundary value separating a low-frequency state from a non-low-frequency state of the compressor. Preferably, the first set frequency could be set in a range from 30 to 40 Hz and vary according to different air conditioning capacities, also may change as the air conditioner working in cooling mode or in heating mode; typically the larger the air conditioning capacity is, the smaller the first set frequency is, and vice versa.

Step 12: determining whether the real-time running frequency is greater than or equal to the first set frequency; if the real-time running frequency is greater than or equal to the first set frequency, performing Step 13; if real-time running frequency is less than the first set frequency, performing Step 14.

Step 13: if the real-time running frequency is greater than or equal to the first set frequency, it is determined that the compressor is working in the non-low-frequency state; obtaining an integral coefficient of the PID algorithm according to a first set rule; then performing Step 15.

Step 14: If in Step 12 it is determined that the real-time running frequency is less than the first set frequency, the compressor is regarded as working at the low-frequency state. If the air conditioner works at the cooling mode, an integral coefficient of the PID algorithm is obtained according to the result of the comparison of the real-time outdoor environment temperature and a first set outdoor environment temperature and a second set rule. But if the air conditioner works at the heating mode, an integral coefficient of the PID algorithm is obtained according to the result of the comparison of the real-time outdoor environment temperature and a first set outdoor environment temperature and a third set rule. Then, Step 15 is being performed.

To be specific, in cooling mode, if the compressor works at the low-frequency state, comparing the real-time outdoor environment temperature with the first set outdoor environment temperature, if the real-time outdoor environment temperature is less than the first outdoor environment temperature, an integral coefficient of the PID algorithm is obtained according to a first set basic integral coefficient and the second set rule; if the real-time outdoor environment temperature is equal to or greater than the first set outdoor environment temperature, an integral coefficient of the PID algorithm is obtained according to a second set basic integral coefficient and the second set rule; wherein the first set outdoor environment temperature is a constant outdoor environment temperature stored in advance and could be modified by authorization. The first set outdoor environment temperature represents a boundary separating a high-temperature outdoor environment condition from a non-high-temperature outdoor environment condition in cooling mode; for example, the first set outdoor environment temperature could be set as 38° C. The first set basic integral coefficient, the second set basic integral coefficient, and the second set rule are also fixed and stored in advance in the air conditioner controller and those parameters could also be modified by authorization.

Further the integral coefficient of the PID algorithm obtained according to the first set rule in Step 13 is greater than or equal to the integral coefficient of the PID algorithm obtained according to the second set rule in Step 14; and the first set basic integral coefficient is greater than the second set basic integral coefficient. To be specific, regardless of whether the real-time outdoor environment temperature is less than the first set outdoor environment temperature, if the compressor works at a high-frequency state, the integral coefficient of the PID algorithm obtained according to the first set rule is greater than or equal to the integral coefficient of the PID algorithm obtained according to the second set rule as the compressor working at the low-frequency state. If the real-time outdoor environment temperature is less than the first set outdoor environment temperature as the compressor working at the low-frequency state, it describes the outdoor ambient is the non-high-temperature outdoor environment condition. In this condition, the first set basic integral coefficient which is used to calculate the integral coefficient of the PID algorithm is greater than the second set basic integral coefficient which is used to calculate the integral coefficient of the PID algorithm under the high-temperature outdoor environment condition that the real-time outdoor environment temperature is greater than or equal to the first set outdoor environment temperature.

In heating mode, if the compressor working at the low-frequency state, comparing the real-time outdoor environment temperature with a second set outdoor environment temperature; if the real-time outdoor environment temperature is greater than the second set outdoor environment temperature, an integral coefficient of the PID algorithm is obtained according to a third set basic integral coefficient and a third set rule; if the real-time outdoor environment temperature is equal to or less than the second set outdoor environment temperature, an integral coefficient of the PID algorithm is obtained according to a fourth set basic integral coefficient and the third set rule; wherein the second set outdoor environment temperature is an outdoor environment temperature value stored in advance and could be modified by authorization. The second set outdoor environment temperature represents a boundary separating a low-temperature outdoor environment condition or a non-low-temperature outdoor environment condition in heating mode; for example, the second set outdoor environment temperature could be set as 10° C. The second set rule could see the description as above. The third set basic integral coefficient and the fourth set basic integral coefficient are also fixed and stored in advance in the air conditioner controller and those parameters could also be modified by authorization.

Further the integral coefficient of the PID algorithm obtained according to the first set rule in Step 13 is greater than or equal to the integral coefficient of PID algorithm obtained according to the third set rule in Step 14, and the third set basic integral coefficient is greater than the fourth set basic integral coefficient. Specifically, regardless of whether or not the real-time outdoor environment temperature is greater than the second set outdoor environment temperature, if the compressor works at the high-frequency state, the integral coefficient of the PID algorithm obtained according to the first set rule is greater than or equal to the integral coefficient of PID algorithm obtained according to the third set rule as the compressor working at the low-frequency state. As the compressor working at the low-frequency state, if the real-time outdoor environment temperature is greater than the second set outdoor environment temperature, it describes the outdoor ambient is the non-low-temperature outdoor environment condition. In this condition, the third set basic integral coefficient which is used to calculate the integral coefficient of the PID algorithm is greater than the fourth set basic integral coefficient which is used to calculate the integral coefficient of the PID algorithm under the low-temperature outdoor environment condition that the real-time outdoor environment temperature is less than the second set outdoor environment temperature.

Step 15: The PID control is performed on the electronic expansion valve opening amount by means of a deviation that is a difference between the real-time exhaust temperature and the second target exhaust temperature.

The Step 15 results from the Step 13 or the Step 14; to be specific, after obtaining the integral coefficient of the PID algorithm with respect to the real-time compressor running frequency according to the first set rule in the Step 13 or according to the second set rule or the third set rule in the Step 14, assigning the obtained integral coefficient to the PID algorithm and performing the PID control on the electronic expansion valve. The PID control is based on the deviation that is the difference between the real-time exhaust temperature and the second target exhaust temperature, wherein the embodiment shown in the FIG. 1 could be referred to for determining the second target exhaust temperature.

The PID control process includes: calculating an error value between the real-time exhaust temperature which is obtained in the Step 11 and a set target exhaust temperature; performing the PID control by means of the error and the integral coefficient obtained in Step 13 or in Step 14 to adjust the electronic expansion valve opening value; wherein the set target exhaust temperature represents a desired exhaust temperature, which could be a preset value or a real-time value. For example, the set target exhaust temperature could be determined in real-time according to refrigerant flow rate or could be determined according to the running frequency of the compressor. Preferably, the set target exhaust temperature is determined according to the running frequency of the compressor. For example, a look-up table is preset and stored in which each available target exhaust temperature is paired with a running frequency range. During the PID control process, with the look-up table, an appropriate target exhaust temperature could be identified according to the real-time running frequency of the compressor and used as the set target exhaust temperature. As a more preferred embodiment, the set target exhaust temperature $T_d$ and the real-time running frequency f are in a linear relation that satisfies the equation: $T_d=m*f+n$, wherein the parameters "m" and "n" are known constants which are stored in advance. The way of calculating the set target exhaust temperature by the linear relation could obtain the maximum energy efficiency ratio of air conditioner.

In the process as described above to control the electronic expansion valve opening amount, as the compressor works at a low-frequency state, a smaller integral coefficient is selected in the PID algorithm, which limited adjustment in a small range as the compressor working in the low-frequency state so as to reduce potential fluctuation of the exhaust temperature or oscillation of adjusted valve opening amount; as the compressor works at a non-low-frequency state, a larger integral coefficient is selected in the PID algorithm, which allows the adjustment within a flexible wide range so as to improve response speed. Those refinements improve the accuracy and reliability of the control on the electronic expansion valve opening amount, which is advantageous to optimizing the energy efficiency ratio of the air conditioning refrigerant circulation. Moreover, the integral coefficient varies with respect to different outdoor environment temperature as the compressor working at the low-frequency state, so that it could prevent potential fluctuation of the exhaust temperature or oscillation of the adjusted opening amount caused by the worsen outdoor environment. The consideration on both of compressor operating parameters and outdoor environment conditions makes the control method more widely available to varied air conditioner capacities or working conditions.

As a preferred embodiment, the first set rule in Step 13 is the integral coefficient is a fifth set integral coefficient. With the first set rule, procedures for obtaining the integral coefficient comprises: assigning the fifth set integral coefficient into the integral coefficient variable of the PID algorithm, that is to say, if the real-time running frequency is greater than or equal to the first set frequency, the integral coefficient of the PID algorithm is a fixed value. That simple design for the PID controller could achieve a much greater effect.

After obtaining the integral coefficient in Step 13, assigning a differential coefficient variable of the PID algorithm in Step 15; there is no limit to the value of the differential coefficient, it could be fixed. But the assignment of a proportional coefficient variable in the PID algorithm is preferable determined on the basis of the integral coefficient obtained. In order to improve the stability on the control of the electric expansion valve opening amount, as a preferred embodiment, procedures after obtaining the integral coefficient of the PID algorithm according to the first set rule in Step 13 further include: based on a first corresponding relation in which available proportional coefficients are paired with integral coefficients, obtaining a proportional coefficient with respect to the integral coefficient of the PID algorithm obtained according to the first set rule. In this way, the proportional coefficient obtained in Step 15 is a value paired with the integral coefficient acquired according to the first set rule and results from the first corresponding relation in which proportional coefficients associate to integral coefficients. More preferably, if the integral coefficient is the fifth set integral coefficient, the proportional coefficient is a first set proportional coefficient which is also a fixed value.

In Step 14, the second set rule as the air conditioner working in cooling mode preferably includes the following steps:

If the real-time outdoor environment temperature is less than the first set outdoor environment temperature and the real-time running frequency is less than a second set frequency, the integral coefficient is the first set basic integral coefficient;

If the real-time outdoor environment temperature is less than the first set outdoor environment temperature and the real-time running frequency is greater than or equal to a second set frequency, the integral coefficient $k_i$ satisfies $k_i=(f-\text{the second set frequency})*2+\text{the first set basic integral coefficient}$;

If the real-time outdoor environment temperature is equal to or greater than the first set outdoor environment temperature and the real-time running frequency is less than the second set frequency, the integral coefficient is the second set basic integral coefficient;

As the real-time outdoor environment temperature is equal to or greater than the first set outdoor environment temperature and the real-time running frequency is equal to or greater than the second set frequency, the integral coefficient $k_i$ satisfies $k_i=(f-\text{the second set frequency})*2+\text{the second set basic integral coefficient}$;

wherein, the second set frequency is less than the first set frequency, and f represents the real-time running frequency.

As the air conditioner working in the cooling mode, further determination is performed by using the second set frequency which is less than the first set frequency, so as to form a frequency buffer range formed by the first set frequency and the second set frequency which is used to determine the real-time compressor running frequency. In the frequency buffer range, the integral coefficient is obtained from the linear relations $k_i=(f-\text{the second set frequency})*2+\text{the first set basic integral coefficient}$ or $k_i=(f-\text{the second set frequency})*2+\text{the second set basic integral coefficient}$, which could avoid the fluctuation of the electronic expansion valve opening amount caused by a sudden change of the integral coefficient as the working state of the compressor converting from the low-frequency state to the non-low-frequency state.

Moreover, as described above, the integral coefficient of the PID algorithm acquired according to the first set rule in Step 13 is greater than or equal to the integral coefficient of the PID algorithm acquired according to the second set rule in Step 14. Therefore, both of the first set basic integral coefficient and the second set basic integral coefficient are less than the fifth set integral coefficient and the maximum of the integral coefficient calculated by the linear formulas $k_i=(f-\text{the second set frequency})*2+\text{the first set basic integral coefficient}$ or $k_i=(f-\text{the second set frequency})*2+\text{the second set basic integral coefficient}$ is the fifth set integral coefficient, that is to say the integral coefficient calculated by the linear formulas is not allowed to be greater than the fifth set integral coefficient. For example, if the integral coefficient $k_i$ calculated according to either of the above formulas is less than the fifth set integral coefficient, $k_i$ is assigned as the calculated value by the formula; and if the integral coefficient $k_i$ calculated according to either of the above formulas is greater than or equal to the fifth set integral coefficient, $k_i$ is assigned the fifth set integral coefficient.

In cooling mode, after obtaining the integral coefficient in Step 14, assigning a differential coefficient variable of the ND algorithm in Step 15; there is no limit to the differential coefficient, it could be fixed. But the assignment of a proportional coefficient variable in the PID algorithm is preferable determined on the basis of the integral coefficient obtained. In order to improve the stability on the control of the electric expansion valve opening amount, as a preferred embodiment, procedures after obtaining the integral coefficient of the PID algorithm according to the first set rule in Step 14 further include: based on a second corresponding relation in which available proportional coefficients are paired with integral coefficients, obtaining a proportional coefficient with respect to the integral coefficient of the PID algorithm obtained according to the second set rule. In this way, the proportional coefficient obtained in Step 15 is a value paired with the integral coefficient acquired according to the first set rule in Step 14 and results from the second corresponding relation in which proportional coefficients associate to integral coefficients. More preferably, the second corresponding relation is: if the integral coefficient is greater than or equal to a sixth set integral coefficient, the proportional coefficient is a second set proportional coefficient; if the coefficient is less than a sixth set integral coefficient, the proportional coefficient is a third set proportional coefficient, wherein the second set proportional coefficient is greater than the third set proportional coefficient.

In Step 14, the third set rule employed in heating mode preferably includes:

If the real-time outdoor environment temperature is greater than the second set outdoor environment temperature and the real-time running frequency is less than the second set frequency, the integral coefficient is the third set basic integral coefficient;

If the real-time outdoor environment temperature is greater than the second set outdoor environment temperature and the real-time running frequency is greater than or equal to the second set frequency, the integral coefficient $k_i=(f-\text{the second set frequency})*1+\text{the third set basic integral coefficient}$;

If the real-time outdoor environment temperature is equal to or less than the second set outdoor environment temperature and the real-time running frequency is less than the second set frequency, the integral coefficient is the fourth set basic integral coefficient;

If the real-time outdoor environment temperature is equal to or less than the second set outdoor environment temperature and the real-time running frequency is equal to or greater than the second set frequency, the integral coefficient $k_i=(f-\text{the second set frequency})*1+\text{the fourth set basic integral coefficient}$;

wherein, the second set frequency and the first set frequency are same as above described, and f is the real-time running frequency.

Similarly, as the air conditioner working in the heating mode, further determination is performed by using the second set frequency which is less than the first set frequency, so as to form a frequency buffer range formed by the first set frequency and the second set frequency which is used to determine the real-time compressor running frequency. In the frequency buffer range, the integral coefficient is obtained from the linear relation $k_i=(f-\text{the second set frequency})*1+\text{the third set basic integral coefficient}$ or $k_i=(f-\text{the second set frequency})*1+\text{the fourth set basic integral}$ coefficient, which could avoid the fluctuation of the electronic expansion valve opening amount caused by a sudden change of the integral coefficient as the working state of the compressor converting from the low-frequency state to the non-low-frequency state.

Moreover, as described above, the integral coefficient of the PID algorithm acquired according to the first set rule in Step 14 is greater than or equal to the integral coefficient of the PID algorithm acquired according to the third set rule in Step 14. Therefore, both of the third set basic integral coefficient and the fourth set basic integral coefficient are less than the fifth set integral coefficient and the maximum of the integral coefficient calculated by the linear formulas $k_i=(f-\text{the second set frequency})*1+\text{the third set basic integral coefficient}$ or $k_i=(f-\text{the second set frequency})*1+\text{the fourth set basic integral coefficient}$ is the fifth set integral coefficient, that is to say the integral coefficient calculated by the linear formulas is not allowed to be greater than the fifth set integral coefficient. For example, if the integral coefficient $k_i$ calculated according to either of the above formulas is less than the fifth set integral coefficient, $k_i$ is assigned the calculated by the formula; and if the integral coefficient $k_i$ calculated according to either of the above formulas is greater than or equal to the fifth set integral coefficient, $k_i$ is assigned the fifth set integral coefficient.

In heating mode, after obtaining the integral coefficient in Step 14, assigning a vale into the differential coefficient variable of the PID algorithm in Step 15; there is no limit to the differential coefficient, it could be a fixed value. But the assignment of a proportional coefficient variable in the PID algorithm is preferable determined on the basis of the integral coefficient obtained. In order to improve the stability on the control of the electric expansion valve opening amount, as a preferred embodiment, procedures after obtaining the integral coefficient of the PID algorithm according to the third set rule in Step 14 further comprising: based on a third corresponding relation associating of available proportional coefficients to integral coefficients, obtaining a proportional coefficient paired with the integral coefficient of the PID algorithm acquired according to the third set rule. In this way, the proportional coefficient obtained in Step 15 is a value paired with the integral coefficient acquired according to the third set rule, which results from the third corresponding relation associating of proportional coefficient to the of integral coefficient. More preferably, the third corresponding relation is: if the integral coefficient is greater than or equal to the seventh set integral coefficient, the proportional coefficient is a fourth set proportional coefficient; if the integral coefficient is less than the seventh set integral coefficient, the proportional coefficient is a fifth set proportional coefficient, wherein the fourth set proportional coefficient is greater than the fifth set proportional coefficient.

In those preferred embodiments, as the first set basic integral coefficient, the second set basic integral coefficient, the third set basic integral coefficient, and the fourth set basic integral coefficient described above, the second set frequency, the fifth set integral coefficient, the sixth set integral coefficient, the seventh set integral coefficient, the first corresponding relation, the second corresponding relation, the third corresponding relation, the first set proportional coefficient, the second set proportional coefficient, the third set proportional coefficient, the fourth set proportional coefficient, and the fifth set proportional coefficient are also fixed and stored in advance in the air conditioner controller, and could also be modified by authorization. The preferred values are: the second set frequency is 25 Hz, the first set basic integral coefficient is 6, the second set basic integral coefficient is 3, and the third set basic integral coefficient is 6, the fourth set the basic integral coefficient is 3, the fifth set integral coefficient is 12, the sixth set integral coefficient is 6, the seventh set integral coefficient is 6, the first set proportional coefficient is 200, the second set proportional coefficient is 200, the third set proportional coefficient is 100, the fourth set proportional coefficient is 200, and the fifth set proportional coefficient is 100.

It will nevertheless be understood that no limitation of the scope of the invention is thereby intended. Any alternations and further modification in the described embodiments, and any further applications of the principles of the invention as described herein are contemplated as would normally occur to one skilled in the art to which the invention relates.

What we claimed is:

1. A method of adjusting an electronic expansion valve in an air conditioner comprises:
   obtaining a real-time running frequency of a compressor of the air conditioner, a real-time discharge temperature and a real-time outdoor environment temperature as the compressor is running, and comparing the real-time running frequency with a first set frequency;
   if the real-time running frequency is greater than or equal to the first set frequency, obtaining an integral coefficient according to a first set rule; if the real-time running frequency is less than the first set frequency, performing a process comprising:
      if the air conditioner is working in a cooling mode, comparing the real-time outdoor environment temperature with a first set outdoor environment temperature; if the real-time outdoor environment temperature is less than the first set outdoor environment temperature, obtaining an integral coefficient of proportional-integral-derivative (PID) algorithm according to a first set basic integral coefficient and a second set rule; if the real-time outdoor environment temperature is greater than or equal to the first set outdoor environment temperature, obtaining an integral coefficient of the PID algorithm according to a second set basic integral coefficient and the second set rule; wherein the integral coefficient of the PID algorithm obtained according to the first set rule is greater than or equal to the integral coefficient of the PID obtained according to the second set rule and the first set basic integral coefficient is greater than the second set basic integral coefficient;
      if the air conditioner is working in a heating mode, comparing the real-time outdoor environment temperature with a second set outdoor environment temperature; if the real-time outdoor environment temperature is greater than the second set outdoor environment temperature, obtaining an integral coefficient of the PID algorithm according to a third set basic integral coefficient and a third set rule; if the real-time outdoor environment temperature is less than or equal to the second set outdoor environment temperature, obtaining an integral coefficient of the PID algorithm according to a fourth set basic integral coefficient and the third set rule; wherein the integral coefficient of the PID algorithm obtained according to the first set rule is greater than or equal to the integral coefficient of the PID obtained according to the third set rule, and the third set basic integral coefficient is greater than the fourth set basic integral coefficient;

performing a PID control by means of the deviation that is a difference of the real-time discharge temperature and a set target discharge temperature on the opening amount of the electronic expansion valve; the integral coefficient of the PID algorithm of the PID control is obtained according to the first set rule, the second set rule or the third set rule;

wherein the first set rule is as follows:
the integral coefficient is a fifth set integral coefficient;
the step of obtaining the integral coefficient according to the first set rule is assigning the fifth set integral coefficient to the integral coefficient variable of the PID algorithm;

wherein the second set rule is as follows:
if the real-time outdoor environment temperature is less than the first set outdoor environment temperature and the real-time running frequency is less than a second set frequency, the integral coefficient is the first set basic integral coefficient;
if the real-time outdoor environment temperature is less than the first set outdoor environment temperature and the real-time running frequency is greater than or equal to the second set frequency, the integral coefficient $k_i$ satisfies $k_i=(f-\text{the second set frequency})*2+\text{the first set basic integral coefficient}$;
if the real-time outdoor environment temperature is greater than or equal to the first set outdoor environment temperature and the real-time running frequency is less than the second set frequency, the integral coefficient is the second set basic integral coefficient;
if the real-time outdoor environment temperature is greater than or equal to the first set outdoor environment temperature and the real-time running frequency is greater than or equal to the second set frequency, the integral coefficient $k_i$ satisfies $k_i=(f-\text{the second set frequency})*2+\text{the second set basic integral coefficient}$;
and the second set frequency is less than the first set frequency and f represents the real-time running frequency; and wherein the third set rule is as follows:
if the real-time outdoor environment temperature is greater than the second set outdoor environment temperature and the real-time running frequency is less than a second set frequency, the integral coefficient is the third set basic integral coefficient;
if the real-time outdoor environment temperature is greater than the second set outdoor environment temperature and the real-time running frequency is greater than or equal to the second set frequency, the integral coefficient $k_i$ satisfies $k_i=(f-\text{the second set frequency})*1+\text{the third set basic integral coefficient}$;
if the real-time outdoor environment temperature is less than or equal to the second set outdoor environment temperature and the real-time running frequency is less than the second set frequency, the integral coefficient is the fourth set basic integral coefficient;
if the real-time outdoor environment temperature is less than or equal to the second set outdoor environment temperature and the real-time running frequency is greater than or equal to the second set frequency, the integral coefficient $k_i$ satisfies $k_i=(f-\text{the second set frequency})*1+\text{the fourth set basic integral coefficient}$;
wherein the second set frequency is less than the first set frequency and f represents the real-time running frequency.

2. The method according to claim 1, wherein after determining the integral coefficient of the PID algorithm according to the first set rule, further comprising:
determining a proportional coefficient with respect to the integral coefficient of the PID algorithm obtained according to the first set rule by means of retrieving in a first corresponding relation in which integral coefficients are paired with available proportional coefficients; and assigning the determined proportional coefficient to the proportional coefficient variable of the PID algorithm of the PID control, wherein the proportional coefficient of the PID algorithm depending on the integral coefficient obtained according to the first set rule and being retrieved from the first corresponding relation in which integral coefficients are paired with proportional coefficients.

3. The method according to claim 1, wherein the first corresponding relation comprises:
the integral coefficient is the fifth set integral coefficient and the proportional coefficient is a first set proportional coefficient.

4. The method according to claim 1, wherein after determining the integral coefficient of the PID algorithm according to the second set rule, further comprising:
determining a proportional coefficient with respect to the integral coefficient of the PID algorithm obtained according to the second set rule by means of retrieving in a second corresponding relation in which integral coefficients are paired with available proportional coefficients; and
assigning the determined proportional coefficient to the proportional coefficient variable of the PID algorithm of the PID control, wherein the proportional coefficient of the PID algorithm depending on the integral coefficient obtained according to the second set rule and being retrieved from the second corresponding relation in which integral coefficients are paired with proportional coefficients.

5. The method according to claim 1, wherein the second corresponding relation comprises:
if the integral coefficient is greater than or equal to a sixth set integral coefficient, the proportional coefficient is a second set proportional coefficient; if the integral coefficient is less than the sixth set integral coefficient, the proportional coefficient is a third set proportional coefficient, wherein the second set proportional coefficient is greater than the third set proportional coefficient.

6. The method according to claim 1, wherein the second set frequency is 25 Hz, the first set basic integral coefficient is 6, the second set basic integral coefficient is 3, and the third set basic integral coefficient is 6, the fourth set the basic integral coefficient is 3, the fifth set integral coefficient is 12, the sixth set integral coefficient is 6, the seventh set integral coefficient is 6, the first set proportional coefficient is 200, the second set proportional coefficient is 200, the third set proportional coefficient is 100, the fourth set proportional coefficient is 200, and the fifth set proportional coefficient is 100.

7. The method according to claim 1, wherein after determining the integral coefficient of the PID algorithm according to the third set rule, further comprising:
determining a proportional coefficient with respect to the integral coefficient of the PID algorithm obtained according to the third set rule by means of retrieving in a third corresponding relation in which integral coefficients are paired with available proportional coefficients; and assigning the determined proportional coefficient to the proportional coefficient variable of the PID algorithm of the PID control, wherein the proportional coefficient of the PID algorithm depending on the integral coefficient obtained according to the third set rule and being retrieved from the third corresponding relation in which integral coefficients are paired with proportional coefficients.

8. The method according to claim 7, wherein the third corresponding relation comprises:
if the integral coefficient is greater than or equal to a seventh set integral coefficient, the proportional coefficient is a fourth set proportional coefficient; if the integral coefficient is less than the seventh set integral coefficient, the proportional coefficient is a fifth set proportional coefficient, wherein the fourth set proportional coefficient is greater than the fifth set proportional coefficient.

* * * * *